(12) United States Patent
Tsuji

(10) Patent No.: US 8,233,933 B2
(45) Date of Patent: Jul. 31, 2012

(54) MOBILE COMMUNICATION SYSTEM

(75) Inventor: Kiyotaka Tsuji, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 584 days.

(21) Appl. No.: 12/365,782

(22) Filed: Feb. 4, 2009

(65) Prior Publication Data

US 2009/0238127 A1 Sep. 24, 2009

(30) Foreign Application Priority Data

Mar. 18, 2008 (JP) ................................. 2008-070039

(51) Int. Cl.
*H04B 7/00* (2006.01)
(52) U.S. Cl. ......................... 455/524; 455/525; 455/517
(58) Field of Classification Search .......... 455/423–425, 455/67.11, 67.13, 67.7, 67.16, 550.1, 552.1, 455/428, 13, 445–448, 527, 561; 370/241–242, 370/225–228, 335, 338, 401
See application file for complete search history.

(56) References Cited

U.S. PATENT DOCUMENTS

| | | | |
|---|---|---|---|
| 7,006,479 B1 | 2/2006 | Joo et al. | |
| 7,151,946 B2 * | 12/2006 | Maggenti et al. | 455/517 |
| 7,499,437 B2 * | 3/2009 | Das et al. | 370/338 |
| 2004/0160939 A1 | 8/2004 | Kim | |
| 2006/0274703 A1 * | 12/2006 | Connelly | 370/338 |

FOREIGN PATENT DOCUMENTS

| | | |
|---|---|---|
| JP | 2000-332699 | 11/2000 |
| JP | 2001-077919 | 3/2001 |
| JP | 2001-339338 | 12/2001 |
| JP | 2003-46425 | 2/2003 |
| JP | 2003-124869 | 4/2003 |
| JP | 2004-228857 | 8/2004 |
| JP | 2004-248292 | 9/2004 |
| JP | 2006-279770 A | 10/2006 |

OTHER PUBLICATIONS

Notice of Reasons for Rejection issued by the Japanese Patent Office on Jun. 15, 2010, for Japanese Patent Application No. 2008-070039, and English-language translation thereof.
Notification of First Office Action Issued by the Chinese Patent Office on Apr. 26, 2011, for Chinese Patent Application No. 2009-10007413.1 and English-language Translation Thereof (11 pages).
Office Action issued by the Japanese Patent Office on Sep. 28, 2010, for Japanese Patent Application No. 2008-070039, and English-language translation thereof (4 pages total).
Combined Search and Examination Report dated Apr. 30, 2009 issued by the UK Intellectual Propery Office (6 pages).

* cited by examiner

*Primary Examiner* — Shawki S Ismail
*Assistant Examiner* — Christopher Lo
(74) *Attorney, Agent, or Firm* — Finnegan, Henderson, Farabow, Garrett & Dunner, L.L.P.

(57) ABSTRACT

According to an aspect of the present invention, there is provided a mobile communication system which comprises a plurality of base stations each accommodating mobile terminals via radio channels, and base station control devices connecting the base stations to an Internet Protocol (IP) network via cable channels, and achieves voice communication through Voice over IP (VoIP) via the IP network. And the mobile communication system comprises a system management device which is connected to the base station control devices via the IP network and acquires operation information of the plurality of base stations through the base station control devices.

4 Claims, 5 Drawing Sheets

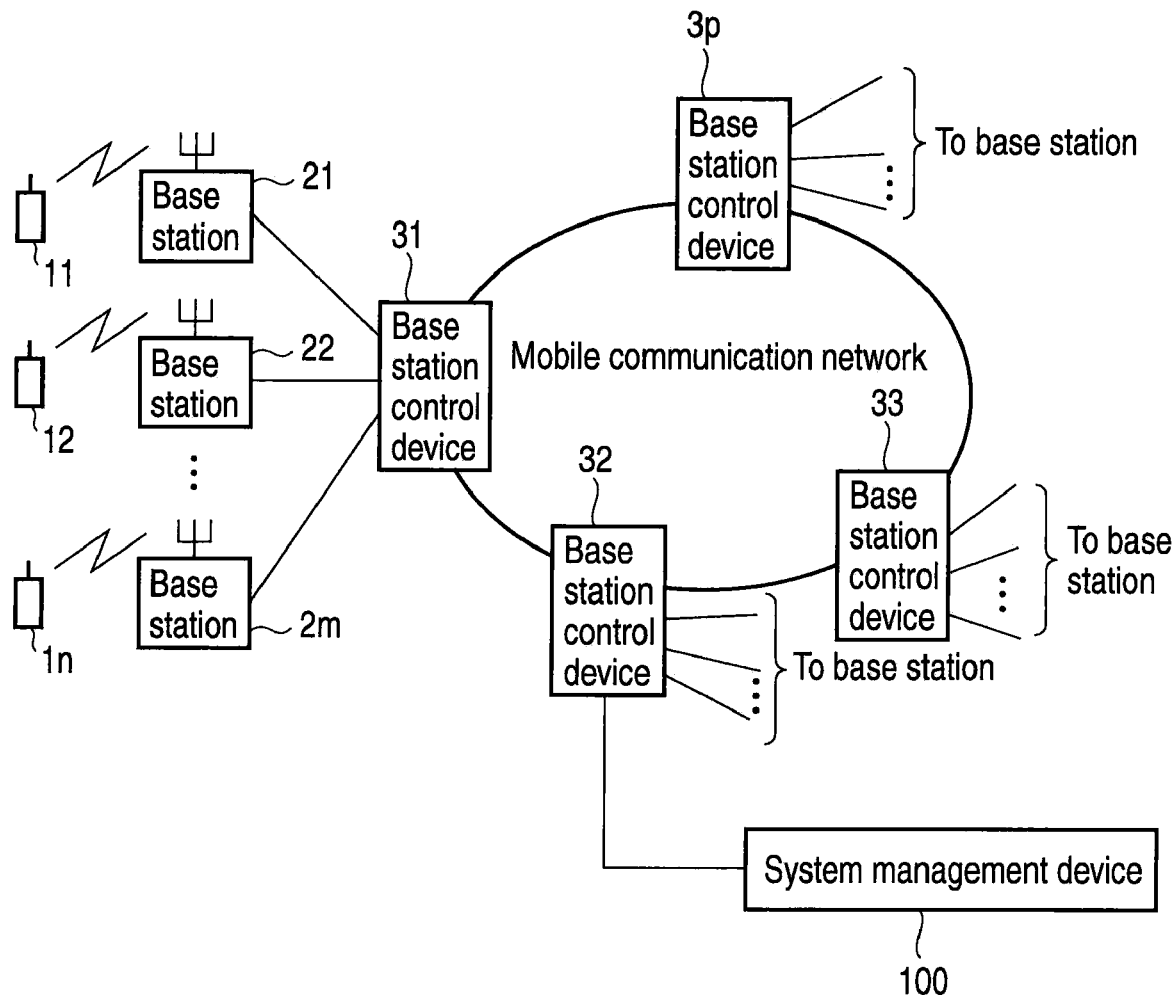
F I G. 1

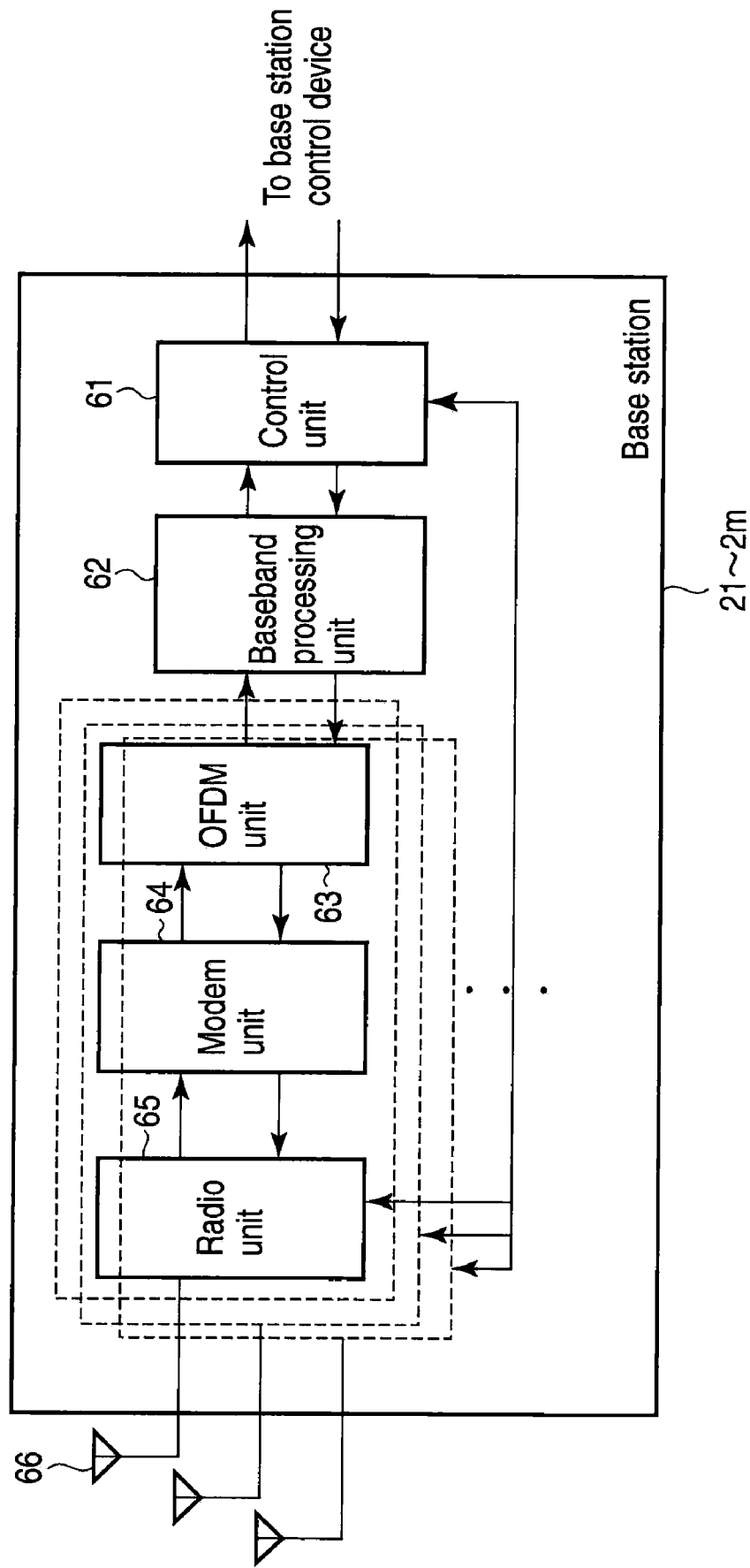
F I G. 2

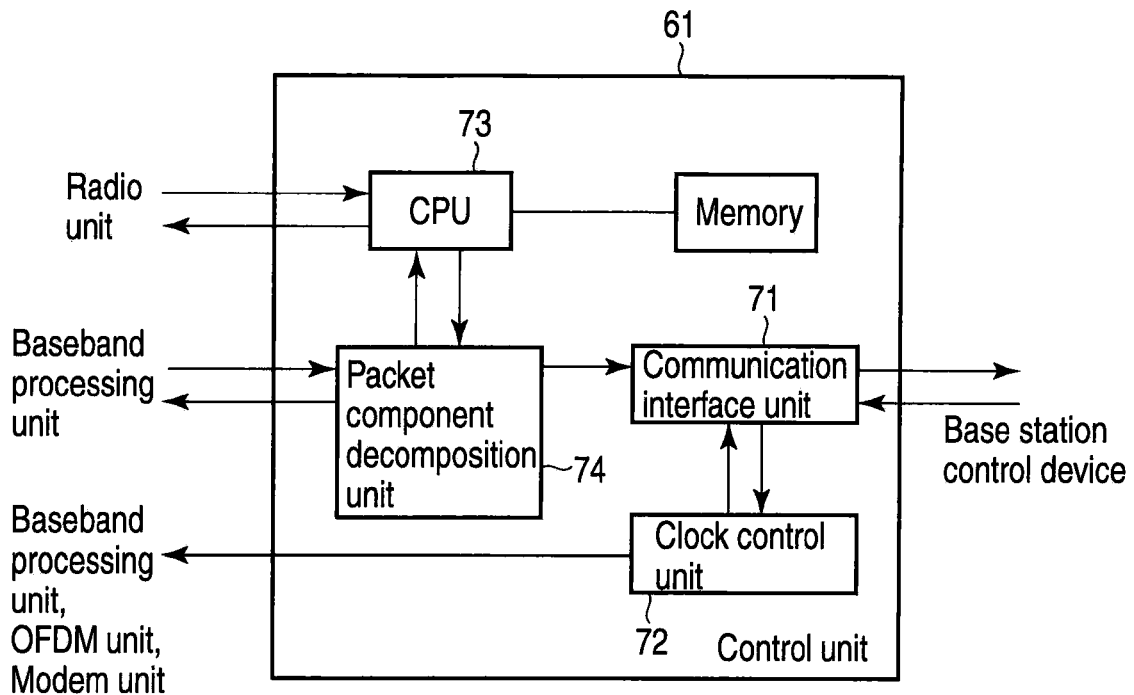
F I G. 3
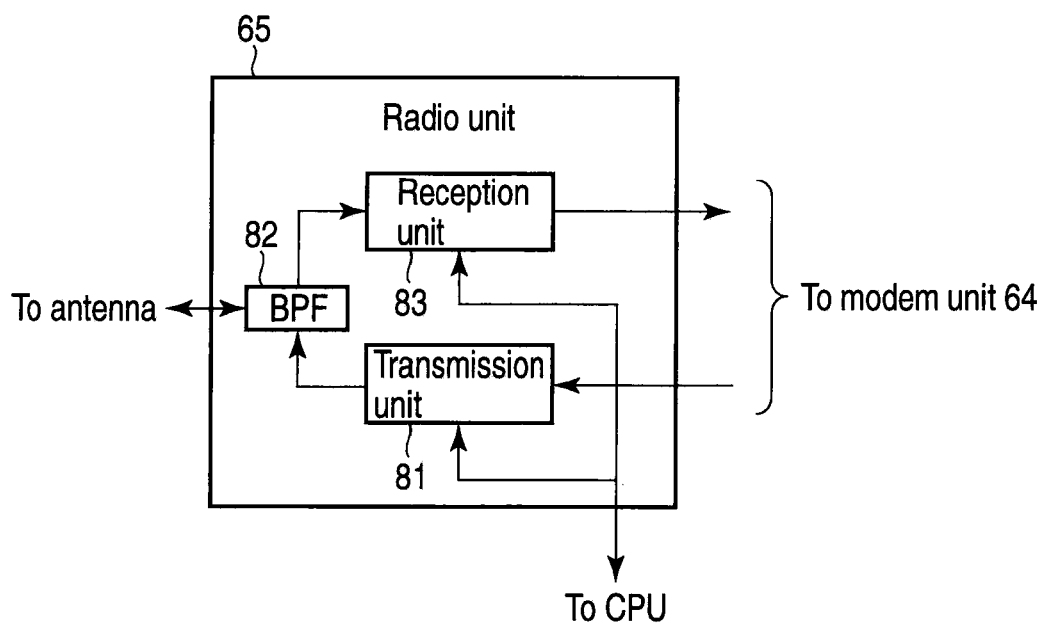
F I G. 4

| Date and time | Failure content | Related information |
|---|---|---|
| 2007-xx-yy-zz | Abnormality content display of base station | Display of number of base station control device accommodating base station |
| 2007-xx-yy-zz | Abnormality content display of base station control device | Display of number of base station under base station control device |
| | | |
| | | |

FIG. 7

| Base station control device number | Base station number |
|---|---|
| 0001 | A1,A2,A3, · · · · |
| 0002 | B1,B2,B3, · · · · |
| · · · · | · · · · |
| · · · · | · · · · |

FIG. 8

MOBILE COMMUNICATION SYSTEM

CROSS-REFERENCE TO RELATED APPLICATIONS

This application is based upon and claims the benefit of priority from prior Japanese Patent Application No. 2008-070039, filed Mar. 18, 2008, the entire contents of which are incorporated herein by reference.

BACKGROUND OF THE INVENTION

1. Field of the Invention

The invention relates to a mobile communication system such as a microcell-type personal handy-phone system (PHS), or a macrocell-type mobile phone system.

2. Description of the Related Art

As is well known, a mobile communication system is provided with a plurality of base stations which individually form radio zones. A calling area of a mobile terminal device is usually formed by a set of a plurality of radio zones. Such a system of this kind is classified roughly into a microcell type and a macrocell type in response to the extent of the radio zone also referred to a cell.

One system may includes the base stations in several tens of thousands, to monitor and control each base station, each base station is accommodated into one base station control device with a certain amount of base stations put together, and the base stations are monitored in groups. For instance, a technique concerning a maintenance management function of the system including the base stations is disclosed in Jpn. Pat. Appln. KOKAI Publication No. 2003-124869.

In recent years, with the advance and wide use of the microcell type, the number of base stations has increased more and more. After starting the use of the next-generation PHS system of which the future spread is expected, it is prescribed of further increase in the number of base stations in future. As the number increases, the number of base station control devices has also increased, in the present situation interfaces for control and management are not uniformized. In such a situation, the system gets behind to find failures; it takes a long time to identify examination, and then, there is a possibility of an occurrence of a trouble in operation of the system.

To begin with, it is necessary to manage and control the base station control device itself by means of any device, and there is the danger of breakdown of the system because of a complicated hierarchical structure of control with enlargement of the system. Like an existing technique, managing and controlling the base stations and the base station control devices by means of individual devices may be a big obstacle to development of the mobile communication system in future.

BRIEF SUMMARY OF THE INVENTION

An object of the invention is to provide a mobile communication system which enhances resistance characteristics to an increase in the number of base stations and improves convenience in management operation.

According to an aspect of the present invention, there is provided a mobile communication system which comprises a plurality of base stations each accommodating mobile terminals via radio channels; and base station control devices connecting the base stations to an Internet Protocol (IP) network via cable channels, and achieves voice communication through Voice over IP (VoIP) via the IP network. And the mobile communication system comprises a system management device which is connected to the base station control devices via the IP network and acquires operation information of the plurality of base stations through the base station control devices.

Thus, according to a system management device which is positioned above the base station control devices, information concerning the operations of the base stations may be integrally managed. Therefore, the mobile communication system may perform control in common with management, make an operator easily understand a variety of items of information, and produce an advantage of shortening a time for discovering failures or identifying examinations.

According to the invention, the mobile communication system, which enhances the resistance characteristics to the increase in the number of base stations and improves the convenience in the management, can be provided.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a system view depicting an embodiment of a mobile communication system of the invention;

FIG. 2 is a functional block diagram depicting base stations 21-2$m$ of FIG. 1;

FIG. 3 is a functional block diagram depicting a control unit 61 of FIG. 2;

FIG. 4 is a functional block diagram depicting a radio unit 65 of FIG. 2;

FIG. 7 is a view depicting an example of a management list displayed on a monitor of a system management device 100; and FIG. 8 is a view depicting another example of the management list displayed on the monitor of the system management device 100.

DETAILED DESCRIPTION OF THE INVENTION

Figure 5:
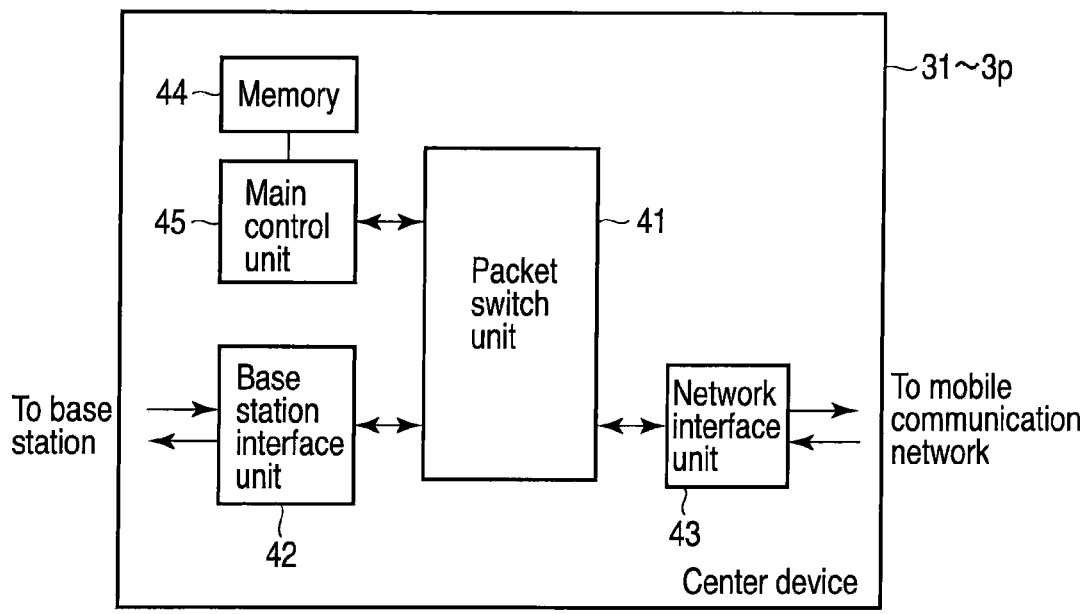
FIG. 5 is a functional block diagram depicting base station control devices 31-3$p$ of FIG. 1.

FIG. 1 shows a system view depicting an embodiment of a mobile communication system of the invention. Hereinafter, a PHS will be described as an example of the mobile communication system. In FIG. 1, a mobile communication network is, for example, an Internet Protocol (IP) network, and includes a plurality of base station control devices 31-3$p$. Each base station control device 31-3$p$ each accommodates a plurality of base stations. For example, a base station control device 31 accommodates base stations 21-2$m$. The existing PHS is configured to directly a base station to the Integrated Services Digital Network (ISDN) via an I' interface and FIG. 1 shows a form differing from the configuration just mentioned above. The base station control devices 31-3$p$ are connected to one another through IP, and mutually transmit and receive control information, voice and data to form a mobile communication network.

In the embodiment, in addition to inter-base station control device 31-3p, an interface between each base station control device 31-3p and the base stations under the control devices 31-3p are made into IP. Thereby, the base stations and the base station control devices can be uniformly connected through IP, and integral management and control can be achieved.

The base stations 21-2m each form individual cell, and forms calling areas including a plurality of cells. Mobile terminals 11-1n are each accommodated into any one of the base stations 21-2m via a radio link, and its access system is a time division multiple access (TDMA) system—a time division duplex (TDD) system. The packets transmitted from the mobile terminal and including voice are made IP, and transmitted to the mobile communication network via the base stations and the base station control devices. That is, the system of FIG. 1 transmits voice data in an IP packet form to establish voice communication, and also referred to as Voice over IP (VoIP).

Meanwhile, the system shown in FIG. 1 includes a system management device 100 positioned above the base station control devices. The management device 100 takes in a variety of items of information from the base station control devices 31-3p via an IP network, and stores information related to the operations of the base stations 21-2m in a database to manage the information.

FIG. 2 is a functional block diagram showing the base stations 21-2m of FIG. 1. In FIG. 2, a control unit 61 takes out data in payload parts from IP packets arrived from the base station control devices, and a baseband processing unit 62 forms radio frames including the data. The radio frames are subjected to orthogonal frequency division multiplexing (OFDM) by OFDM units 63, and are further subjected to orthogonal modulation by modem units 64. The transmission data is power-amplified by radio units 65 and then transmitted from antennas 66.

These operations are performed inversely. That is, the reception waves from the mobile terminals are received by the antennas 66, amplified by low-noise amplifiers in the radio units 65, and then, orthogonal modulation is applied by the modem units 64. Further, the reception waves are subjected to OFDN demodulation by the OFDM unit 63s to be transmitted to the baseband units 62. The baseband units 62 decompose the radio frames to take out the payload parts, and the control units 61 apply processes to the payload parts in the form of IP packets to output to the base station control devices.

Here, the OFDM units 63, modem units 64 and radio units 65 are each modulated and the modules are prepared in a plurality of systems to improve communication quality through transmission diversity and spatial multiplexing. The modulation enables installing plurally, simplifying attachment and detachment, and facilitating troubleshooting. The modules may be individually controlled into operation states and stop states through remote control from the management device 100, and may be changed in the number of operation states in response to communication quality.

FIG. 3 shows a functional block diagram depicting the control unit 61 of FIG. 2. In FIG. 3, a communication interface unit 71 performs interface processing to and from the base station control device. Especially, applying a passive optical network (PON) to make the section optical enables establishing high-rate optical communication.

The interface unit 71 extracts a clock for base station synchronization from the reception packets, and a clock control unit 72 achieves network synchronization to distribute the packets to each unit. Meanwhile, it is determined whether the reception data consists of control packets or voice and image packets for a central processing unit (CPU) 73 depending on a packet header. The former is decomposed by a packet generation and decomposition unit 74 to be transmitted to the CPU 73 and the later is decomposed into packets to be similarly transmitted to the baseband processing unit 62. The data received from the processing unit 62 is IP packetized by the packet generation and decomposition unit 74 to be output to the base station control device.

The control data transmitted to the CPU 73 is interpreted thereby to be processed through various items of control (stop of transmission, increase and decrease in gain of a power amplifier, increase and decrease in a low-noise amplifier, or the like) of a radio unit 65. The various items of control may be performed by means of the system management device 100 through the base station control devices. The status monitoring of the base stations 21-2m is enabled not only by monitoring the transmission outputs and reception statuses and by sequentially reading the statuses from the radio unit 65 to store the statuses in a memory, but also packetizing the statuses through the packet generation and decomposition unit 74 to transmit the statuses to the system management device 100 through the base station control device.

In the existing technique, in a case where a failure occurs in the base stations 21-21m or base station control devices 31-31p, it is necessary to firstly confirm the base station control devices 31-3p one by one, and after confirming which base station is connected to which base station control device, it is necessary to extract messages displayed on each base station control device to identify at which part of the base stations 21-2m or the base station control devices 31-31p the failures occur.

Meanwhile, in the embodiment, since the system management device 100 is installed to integrate the system, and the system management device 100 manages the statuses of the base stations 21-21m and the base station control devices 31-31p in a database manner, it makes it possible to operate for simultaneously displaying the base stations and the base station control devices with any failure that has occurred therein, and to shorten the time required for the failure identification.

FIG. 4 is a functional block diagram depicting the radio unit 65 of FIG. 2. The transmission frame from the modem unit 64 is amplified by a power amplifier which is provided for a transmission unit 81 to be radiated from the antenna 66 through a band-pass filter (BPF) 82. The power amplifier includes a control interface capable of performing a variety of items of control from the CPU 73. The reception wave received by the antenna 66 is amplified by a low-noise amplifier of a reception unit 83 then output to the modem unit 64. The low-noise amplifier includes automatic gain control (AGC). The low-noise amplifier also includes a control interface capable of performing a variety of items of control from the CPU 73.

FIG. 5 shows a functional block diagram depicting each of the base station control devices 31-3p of FIG. 1. Each control device 31-3p comprises a packet switch unit 41, a base station interface unit 42, a network interface 43, a memory 44, and a main control unit 45. Among of them, the base station interface unit 42 performs interface processing for connecting to the base stations, and the network interface unit 43 performs interface processing for connecting to the mobile communication network.

Both the base station interface 42 and the network interface unit 43 transmit and receive IP packets, and the packet switch unit 41 disposed therebetween performs an exchange of packets. The main control unit 45 integrally controls the exchange of packets, a variety of items of control inside the device and monitoring operations, the memory 44 stores programs and a variety of items of setting data for the control therein. Connecting between the base station interface unit 42 and the network interface 43 through the packet switch unit 41 enables direct connection between the base stations and the mobile communication network. Thereby, the transmission delay may be reduced as much as possible by eliminating the main control unit 45 from the transmission path of the packets.

Figure 6:
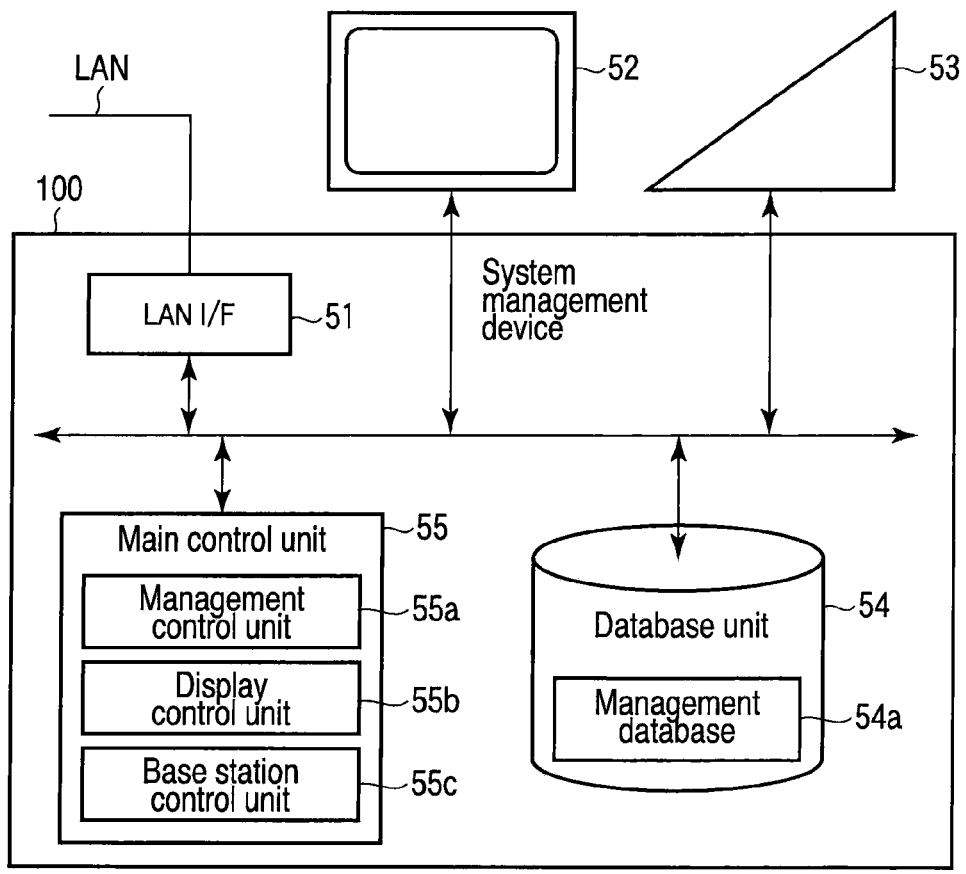
FIG. 6 is a functional block diagram depicting system management device 100 of FIG. 1.

FIG. 6 is a functional block diagram depicting system management device 100 of FIG. 1. The system management unit 100 includes an interface unit 51, display unit 52, an input and output unit 53, a database unit 54 and a main control unit 55. The interface unit 51 is connected to the LAN and takes on processing in relation to transmission and reception of packets. The display unit 52 provides a user interface together with the input and output unit 53 and realizes a graphical user interface (GUI) environment.

The main control unit 55 includes a management control unit 55a, a display control unit 55b, and a base station control unit 55c as its processing function.

The management control unit 55a acquires operation information of each base stations 21-21m through the base station control devices 31-3p. One example of the operation information is failure information. The management control unit 55a manages the acquired information in database form. The management database 54a in the database unit 54 is an example of a database. The display control unit 55b acquires the information related to failures occurred in each base station 21-21m from the management database 54a. The display control unit 55b sorts the information to display the sorted information as a list on the display unit 52. The base station control unit 55c controls each base station 21-21m on the basis of operation information managed in the management database 54a.

Especially, the base station control unit 55c individually specifies to control a plurality of modules provided for the base stations 21-2m. The base station control unit 55c individually controls the plurality of modules provided for the base stations 21-2m into operation/operation stop statuses in response to communication quality. The base station control unit 55c individually controls radio transmission outputs from the plurality of modules for each module. The base station control unit 55c realizes these controlling operations on the basis of operation information managed in the management database 54a.

In the foregoing configuration, providing a function of mutually transmitting and receiving information to and from the base stations for the system management device 100, providing a function of mutually transmitting and receiving information to and from the base station control device for each base station, and providing a function of mutually transmitting and receiving information to and from the system management device 100 and the base stations as an interface of both of them for the base station control device allows the system management device 100 to integrally manage operation data of the base stations 21-2m, and the following application may be a possible example.

FIG. 7 shows a view depicting an example of a management list displayed on the monitor of the management device 100. In this way, associating date and time, failure content and related information with one another to make a list display, allows a system operator to give facility. To achieve this convenience, (1) log collection function of the base stations and base station control device; (2) database function of associating the base stations with the base station control device with the base stations accommodated therein; (3) database function of associating connection relationships of the base station control device may be built into the system.

The data which cannot go in a log display screen in FIG. 7 may display as detailed information, for example, on another screen shown in FIG. 8. In addition, providing a function of managing an inside substrate configuration for each base station and providing a function of forming a substrate configuration for each base station as a database allows (4) putting a function of controlling RF power (radio transmission output) for each substrate of the base stations in the management device 100.

As mentioned above, in the embodiment, the interface between the base stations and the base station control device, and the mutual interface among base station control devices are made common, and the IP that is a general-purpose protocol is used as a uniformed protocol. The uniformity makes it possible for the system management device 100 that is a high order device to integrally manage and control over the base stations and base station control device. With the above in mind, according to the invention, the mobile communication system which enhances resistance against the increase in the number of base stations and improves the convenience of management operations can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile communication system which comprises a plurality of base stations each accommodating mobile terminals via radio channels; and base station control devices connecting the base stations to an Internet Protocol (IP) network via cable channels, and achieves voice communication through Voice over IP (VoIP) via the IP network, comprising:
a system management device which is connected to the base station control devices via the IP network, acquires operation information of the base station control devices and acquires operation information of the plurality of base stations through the base station control devices, the system management device further comprising:
a management control unit to store the acquired operation information in a database form to manage the operation information; and
a control unit to individually control the base station control devices and the plurality of base stations on the basis of operation information managed in the database, wherein the control unit specifies a plurality of modules provided for the base stations individually to control the individually specified modules.

2. The system according to claim 1, wherein
the system management device further comprises:
a management unit to store the acquired operation information in a database form to manage the operation information; and
a display control unit to sort information related to failures occurred in each of the base station control devices and each of the stations from the database to display the information as a list.

3. The system according to claim 1, wherein
the control unit controls the plurality of modules for each module into operation/operation stop statuses in response to communication quality.

4. The system according to claim 1, wherein
the control unit controls radio transmission outputs from the plurality of modules for each module.

* * * * *